United States Patent
Jacobson

[15] 3,657,931
[45] Apr. 25, 1972

[54] NEUTRALLY FLOATED GYRO WITH MENISCUS CENTERING

[72] Inventor: Oscar D. Jacobson, New York City, N.Y.
[73] Assignee: The Bendix Corporation
[22] Filed: Feb. 24, 1970
[21] Appl. No.: 13,545

[52] U.S. Cl..................................74/5, 308/161, 308/240
[51] Int. Cl........................................................G01c 19/16
[58] Field of Search.....................74/5, 5.7; 308/161, 240

[56] References Cited

UNITED STATES PATENTS

| | | | |
|---|---|---|---|
| 2,980,473 | 4/1961 | Tanis | 308/161 |
| 3,018,142 | 1/1962 | Warnock, Jr. | 74/5 X |
| 3,169,807 | 2/1965 | Abel et al. | 308/9 |
| 3,262,324 | 7/1966 | Taylor | 74/5 |
| 3,262,744 | 7/1966 | Thomas | 308/240 |
| 3,530,728 | 9/1970 | Evans et al. | 74/5 |

FOREIGN PATENTS OR APPLICATIONS 854,507  11/1960  Great Britain.............................74/5

Primary Examiner—Manuel A. Antonakas
Attorney—Peter C. Van Der Sluys and Plante, Hartz, Smith and Thompson

[57] ABSTRACT

A gyro rotor having continuous circumferential grooves and a plurality of pockets formed in the surface thereof is contained within a housing having an inner surface juxtaposed with the rotor surface. The grooves, pockets and the spaces adjacent thereto are filled with a heavy liquid having a high surface tension to form liquid rings and pads. The liquid is captivated in the rings and pads by meniscuses formed between the juxtaposed surfaces. The rings neutrally float the rotor and the meniscuses around the pads center the rotor within the housing.

2 Claims, 2 Drawing Figures

Patented April 25, 1972

3,657,931

INVENTOR.
OSCAR D. JACOBSON

BY

AGENT

3,657,931

NEUTRALLY FLOATED GYRO WITH MENISCUS CENTERING

BACKGROUND OF THE INVENTION

1. Field of the Invention

This invention relates to gyroscopes and more particularly to gyroscopes having floated rotors.

2. Description of the Prior Art

Heretofore, gyro rotors have been supported by hydrostatic bearings when low friction was required. Hydrostatic bearings required extensive use of pumps and plumbing to provide gas flow to the bearing surfaces, thus making hydrostatic bearings unreliable, bulky and costly. Magnetic centering means were usually required to maintain alignment of the rotor within the gyro housing.

Pools of mercury have been used in the prior art to float indicating devices and provide an antifriction support; however, this method could be used only for instruments operating in a substantially vertical position.

In U. S. application Ser. No. 855,895, filed Sept. 8, 1969, and now abandoned an apparatus was disclosed for providing a low friction support between relatively rotatable members. This apparatus provided a rotatable member housed within a stationary member said members having opposing bearing surfaces. One of the surfaces had formed therein pockets for receiving mercury which was sealed within the pockets and the spaces adjacent thereto by meniscuses formed between the opposing bearing surfaces. The rotating member was supported within the stationary housing by mercury pads formed by the meniscuses and the meniscuses provided centering for the rotating member within the housing. While the mercury pads had considerable strength they were somewhat limited as to the weight of the rotatable member that could be supported. The present invention overcomes the limitations of the copending application in that the mercury pads used herein need only center the rotor since the rotor is neutrally floated by continuous mercury rings.

SUMMARY OF THE INVENTION

The present invention utilizes the inventive concepts disclosed in the aforementioned copending application and provides an improvement over the invention disclosed therein. The present invention contemplates a gyroscope having a rotor that has one or more continuous circumferential grooves and a plurality of pockets formed in the surface thereof. The grooves, pockets and the spaces adjacent thereto are filled with a heavy liquid having a high surface tension such as mercury to form continuous liquid rings and pads. The liquid is captivated within the rings and pads by meniscuses formed between the rotor and an outer housing by the surface tension of the liquid. The rings float the rotor while the meniscuses formed around the pads center the rotor within the housing thus eliminating the need for centering by hydrostatic or magnetic means. The width of the grooves are varied to adjust the buoyant force exerted by the liquid to neutrally float the rotor thereby limiting the force exerted on the meniscuses by the weight of the rotor.

One object of the present invention is to provide a low friction support for a gyro rotor that is self-centering and does not require additional centering means.

Another object of the invention is to provide a gyro having a neutrally floated rotor that utilizes meniscus centering.

Another object of the invention is to provide a gyro having a floated rotor including means to adjust for neutral floatation.

The foregoing and other objects and advantages of the invention will appear more fully hereinafter from a consideration of the detailed description which follows, taken together with the accompanying drawings wherein two embodiments of the invention are illustrated by way of example.

DESCRIPTION OF THE INVENTION

Figure 1:
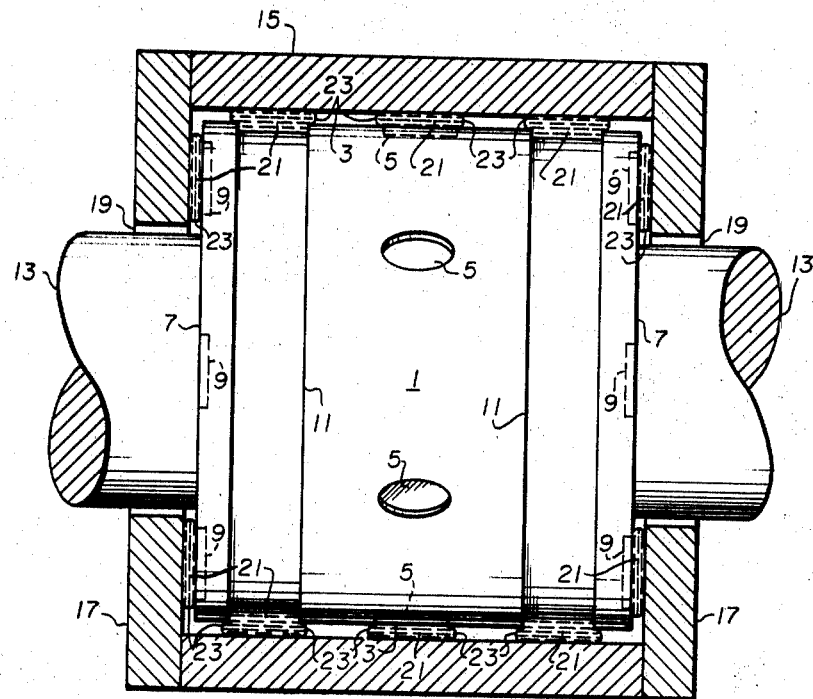
FIG. 1 shows a rotor assembly, constructed in accordance with the present invention, having outer housing cut away.

Referring to FIG. 1 a cylindrical gyro rotor 1 has a cylindrical bearing surface 3 having a plurality of circular pockets 5 formed therein and equally disposed circumferentially about the center of the cylindrical surface. Rotor 1 also has two parallel end bearing surfaces 7 each having a plurality of pockets 9 formed therein and positioned about circles concentric with the edges of the surfaces and having a diameter slightly less than the diameter of the end surfaces. Two circumferential grooves 11 are formed in surface 3 one near each edge of the cylindrical surface. A shaft 13 is connected to rotor 1 for rotating the rotor.

Rotor 1 is enclosed in a stationary housing comprising a hollow cylinder 15 and two end plates 17 having openings 19 for shaft 13 to pass therethrough. Cylinder 15 and end plates 17 have inner bearing surfaces juxtaposed with the surfaces 3 and 7 respectively. Pockets 5 and 9 and grooves 11 and the spaces adjacent thereto and between the juxtaposed surfaces are filled with a heavy liquid 21 having a high surface tension, such as mercury. Cylindrical surface 3, end surfaces 7 and the inner surfaces of the housing are coated with a material that is not wetted by liquid 21. The surface tension of the liquid forms meniscuses 23 between the juxtaposed surfaces to retain the liquid with pockets 5 and 9 and grooves 11 and the spaces adjacent thereto.

The liquids within grooves 11 forms two continuous circumferential rings within which rotor 1 is neutrally floated. Pressures are exerted on the rotor in directions perpendicular to the surface of the grooves; however, the downward pressure exerted on the upper surface is less than the upward pressure exerted on the lower surface resulting in a net upward pressure determined by the density of the liquid and the diameter of the grooves. The net upward pressure is exerted on the surface area of the grooves to establish a buoyant force which may be varied by varying the surface area of the grooves. Thus the grooves are made sufficiently wide to develope a buoyant force equal to the weight of the rotor. Neutral floatation of the rotor in this manner greatly relieves the forces exerted on meniscuses 23 surrounding pockets 5, thus overcoming the rotor weight limitations of the prior art.

The liquid in pockets 5 and 9 forms hydraulic heads or pads that center rotor 1 within the housing. The meniscuses 23 prevent the rotor from shifting position and touching the inner surfaces of cylinder 15 and end plates 17. The liquid rings and pads provide an essentially friction free support for rotor 1.

The embodiment of FIG. 1 may be modified by forming the pockets in the inner surfaces of cylinder 15 and end plates 17 and grooves could be formed in the inner surface of cylider 15. In such a configuration the pads of the mercury do not rotate but remain stationary within the housing thus preventing mass shifts.

Magnetic means, well known to those skilled in the art, may be utilized for rotating rotor 1 thereby eliminating the need for shaft 13 and openings 19 in end plates 17.

In the embodiment shown in FIG. 1 a single groove 11 could be formed about the center of cylindrical surface 3 and the pockets 5 could be circumferentially disposed about the cylindrical surface on each side of the groove.

Figure 2:
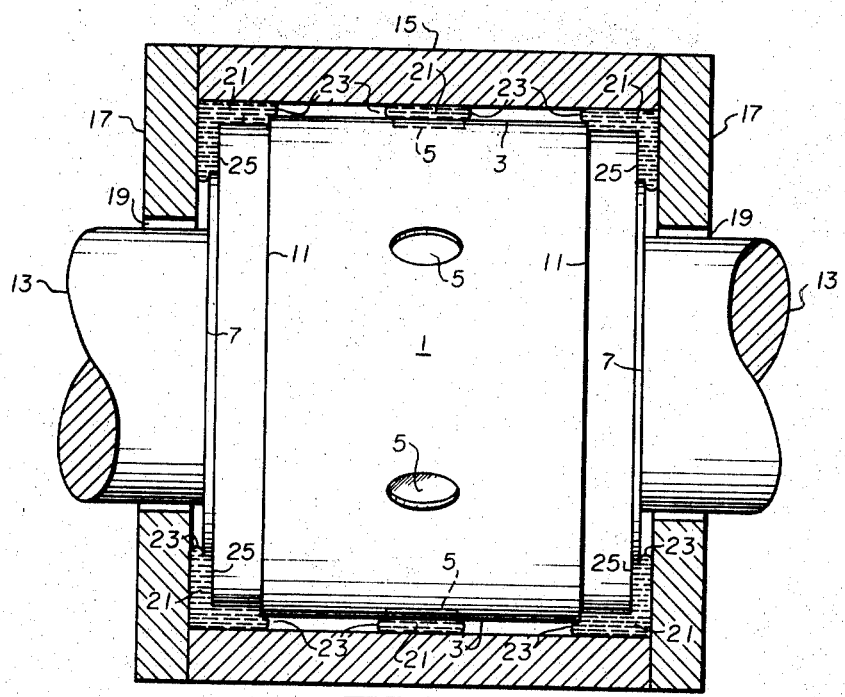
FIG. 2 shows another embodiment of the invention with the outer housing cut away.

Referring to FIG. 2 there is shown another embodiment of the present invention wherein the pockets 9 shown in the embodiment of FIG. 1 are eliminated. Grooves 11 are formed along the edges of cylindrical surface 3 and the edges of surface 7 have circular grooves 25 formed therein. The grooves are filled with liquid 21 to form two continuous circumferential rings each having a right angle cross section. Liquid 21 is retained within the grooves and in the spaces adjacent thereto by meniscuses 23 formed between the surfaces of rotor 1 and the inner surfaces of cylinder 15 and end plates 17. The liquid rings neutrally float rotor 1 in the same manner as the rings shown in the embodiment of FIG. 1. The width of grooves 11 is varied so that the buoyant force exerted by the liquid substantially equals the weight of rotor 1. The meniscuses formed between surfaces 7 and the inner surfaces of end plates 17 provide axially centering of rotor 1 within the housing, thus eliminating the need for the pockets 9 shown in FIG. 1 and the mercury pads associated therewith.

Thus the present invention proves a low friction self-centering support for a gyro rotor. The rotor weight does not present any substantial design restrictions and the gyro can sustain substantial acceleration and shock. The rotor is neutrally floated by a buoyant force that is adjusted by varying the width of the grooves.

What is claimed is:

1. A gyroscope having a rotor assembly, comprising:
 a rotatable member having an outer bearing surface;
 a stationary member housing the rotatable member and having an inner bearing surface juxtaposed with the outer bearing surface of the rotatable member;
 the rotatable member being a cylinder having a cylindrical surface and two parallel end surfaces and the stationary member having a cylindrical surface and parallel surfaces juxtaposed with the corresponding surfaces of the rotatable member, one of the cylindrical surfaces having a groove and pockets formed therein and one of each set of juxtaposed end surfaces having pockets formed therein;
 a heavy non-wetting liquid having a high surface tension contained within the pockets and groove and between the bearing surfaces by meniscuses formed between the juxtaposed surfaces, the meniscuses around the pockets centering the rotatable member with the stationary member and the liquid in the groove forming a continuous circumferential ring to neutrally float the rotating member; and
 means for rotating the rotatable member.

2. A gyroscope having a rotor assembly, comprising:
 a rotatable member having an outer bearing surface;
 a stationary member housing the rotatable member and having an inner bearing surface juxtaposed with the outer bearing surface of the rotatable member;
 pockets being formed in both juxtaposed surfaces and arranged so that the pockets in one surface do not coincide with those in the juxtaposed surface when the rotor is rotated;
 a heavy non-wetting liquid having a high surface tension contained within the pockets and groove and between the bearing surfaces by meniscuses formed between the juxtaposed surfaces, the meniscuses around the pockets centering the rotatable member with the stationary member and the liquid in the groove forming continuous circumferential ring to neutrally float the rotating member; and
 means for rotating the rotatable member.

* * * * *